US010683038B2

(12) United States Patent
Fleckenstein et al.

(10) Patent No.: US 10,683,038 B2
(45) Date of Patent: Jun. 16, 2020

(54) CARAVAN WINDOW WITH VENTILATION

(71) Applicant: Dometic Sweden AB, Solna (SE)

(72) Inventors: Joachim Fleckenstein, Karlstein (DE); Samuele Meda, Solna (SE); Robert Horvath, Freyung (DE)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 16/110,743

(22) Filed: Aug. 23, 2018

(65) Prior Publication Data

US 2019/0061829 A1    Feb. 28, 2019

(30) Foreign Application Priority Data

Aug. 24, 2017   (DE) .................. 10 2017 214 863

(51) Int. Cl.
*B60H 1/26* (2006.01)
*B60H 1/24* (2006.01)
(Continued)

(52) U.S. Cl.
CPC ......... *B62D 25/06* (2013.01); *B60H 1/00364* (2013.01); *B60H 1/262* (2013.01); *B60H 1/267* (2013.01); *B60P 3/32* (2013.01)

(58) Field of Classification Search
CPC ........ B62D 5/06; B62D 5/07; B60H 1/00357; B60H 1/00364; B60H 1/00371;
(Continued)

(56) References Cited

U.S. PATENT DOCUMENTS

| 1,722,825 A | * | 7/1929 | Roethel | ............. B60H 1/00464 |
| | | | | 454/136 |
| 2,372,164 A | * | 3/1945 | Woodhams | ............ B60H 1/262 |
| | | | | 217/60 C |

(Continued)

FOREIGN PATENT DOCUMENTS

| AU | 201710944 | 3/2017 |
| CH | 398364 A | 3/1966 |

(Continued)

OTHER PUBLICATIONS

Australian Patent Application No. 2018217330 entitled "Caravan window with ventilation" filed Aug. 24, 2018.
(Continued)

*Primary Examiner* — Kyle J. Walraed-Sullivan
(74) *Attorney, Agent, or Firm* — Middleton Reutlinger

(57) ABSTRACT

Rooflight or window 1 for vehicles, particularly for a recreational vehicle, comprising a window frame 2, the window frame 2 comprises a ventilation path allowing air exchange between the inside and the outside of the vehicle, wherein the window frame 2 comprises ventilation slots 4, 5 at least at a surface 8 of the window frame 2 facing the inside of the vehicle, wherein the rooflight or window 1 further comprises a cover 3 being connected to the window frame 2 and covering the surface 8 of the window frame 2 facing the inside of the vehicle, wherein along the outer edge of the window frame 2 a circumferential gap 9 is present between the window frame 2 and the cover 3 functioning as a canal for ventilation air.

6 Claims, 5 Drawing Sheets

Figure 1:
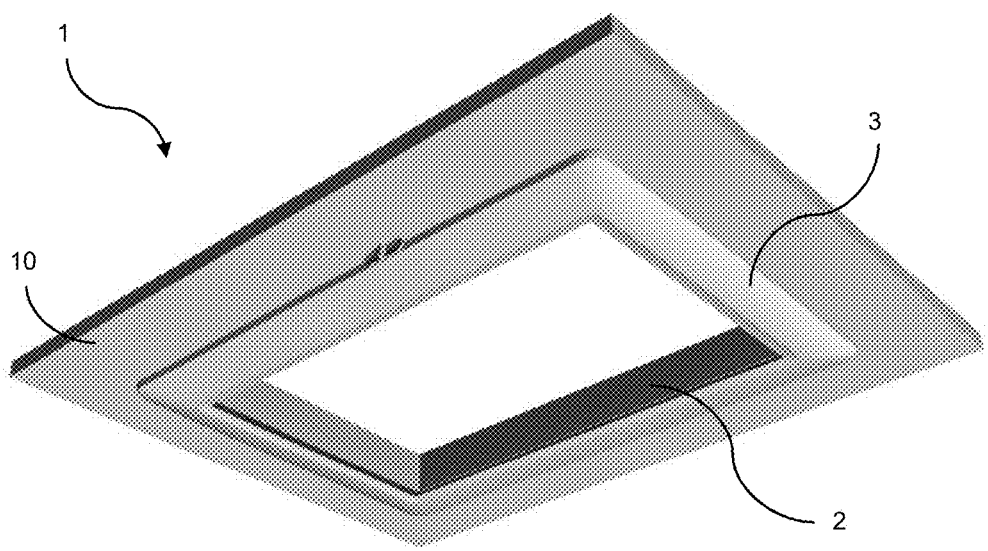

(51) Int. Cl.
    *B62D 25/06*      (2006.01)
    *B60H 1/00*      (2006.01)
    *B60P 3/32*      (2006.01)

(58) Field of Classification Search
    CPC ............ B60H 1/00378; B60H 1/245; B60H 1/00849; B60H 1/00535; B60H 1/00828; B60H 1/262; B60H 1/265; B60H 2001/00235; B61D 27/009; B60J 7/0435
    USPC ........... 296/190.9, 216.02; 454/94, 376, 365
    See application file for complete search history.

(56) References Cited

U.S. PATENT DOCUMENTS

| | | | | |
|---|---|---|---|---|
| 3,654,850 | A * | 4/1972 | Berkus | F23L 17/02 454/115 |
| 3,680,468 | A * | 8/1972 | Schueler | B60H 1/00364 454/324 |
| 3,842,722 | A * | 10/1974 | Miller | F24F 13/06 137/527.6 |
| 3,895,568 | A * | 7/1975 | Stone | B60H 1/262 454/348 |
| 3,934,383 | A * | 1/1976 | Perry | E04D 13/0352 52/200 |
| 4,038,911 | A * | 8/1977 | Hart | B60H 1/262 454/94 |
| 4,085,965 | A * | 4/1978 | Schlapp | B60J 7/024 296/213 |
| 4,090,436 | A * | 5/1978 | Wright | B60H 1/262 454/136 |
| 4,104,825 | A * | 8/1978 | Hosmer | B60J 7/1642 160/369 |
| 4,106,399 | A * | 8/1978 | Lawrence, Jr. | B60H 1/262 454/94 |
| 4,136,605 | A * | 1/1979 | Johnson | B60H 1/262 454/136 |
| 4,196,657 | A * | 4/1980 | Crongeyer | B60H 1/262 454/107 |
| 4,201,122 | A * | 5/1980 | Maciag | B60H 1/262 296/210 |
| 4,300,440 | A * | 11/1981 | Holter | B60J 7/1642 114/201 R |
| 4,531,777 | A | 7/1985 | Bienert et al. | |
| 4,615,263 | A * | 10/1986 | Titterud | B60J 7/1642 454/94 |
| 4,633,769 | A * | 1/1987 | Milks | F24F 7/025 454/117 |
| 4,690,040 | A * | 9/1987 | Barnett | B60J 7/1642 454/136 |
| 4,759,270 | A * | 7/1988 | Lindeen | B60H 1/00364 403/408.1 |
| 4,895,065 | A * | 1/1990 | Lamparter | B60H 1/00457 454/136 |
| 5,054,377 | A * | 10/1991 | Mochel | B60H 1/262 296/217 |
| 5,501,634 | A * | 3/1996 | Wilder | B60H 1/00378 454/109 |
| 5,791,156 | A * | 8/1998 | Strautman | F24F 13/22 62/244 |
| 5,797,791 | A * | 8/1998 | Humphrey | B60J 1/08 454/134 |
| 5,820,247 | A * | 10/1998 | Schuler | F21V 3/02 362/96 |
| 6,106,385 | A * | 8/2000 | Humphrey | B60H 1/26 454/134 |
| 6,227,962 | B1 * | 5/2001 | Orendorff | F24F 13/082 454/289 |
| 6,339,934 | B1 * | 1/2002 | Yoon | B60H 1/00364 62/244 |
| 6,540,288 | B1 * | 4/2003 | Tobin | B60J 7/1642 296/216.02 |
| 6,609,750 | B1 * | 8/2003 | Cauduro | B60J 7/1642 296/216.02 |
| 7,731,574 | B2 * | 6/2010 | Milks | B60J 7/1642 296/216.02 |
| 8,082,812 | B2 | 12/2011 | Schumacher | |
| 8,677,689 | B1 | 3/2014 | Draper et al. | |
| 8,770,774 | B2 * | 7/2014 | Ye | F21V 33/0096 362/235 |
| 9,597,948 | B2 * | 3/2017 | Butz | B60J 7/19 |
| 10,059,164 | B1 * | 8/2018 | Jerney | B60H 1/262 |
| D832,416 | S * | 10/2018 | Huang | D23/370 |
| 10,093,152 | B2 * | 10/2018 | Allard | B60H 1/262 |
| 2002/0153752 | A1 | 10/2002 | Lamparter | B60J 7/1642 296/216.02 |
| 2004/0127152 | A1 * | 7/2004 | Malott | B60H 1/00364 454/136 |
| 2005/0003751 | A1 * | 1/2005 | Thomas | B60H 1/00364 454/136 |
| 2007/0015450 | A1 * | 1/2007 | Bickel | B60H 1/262 454/69 |
| 2007/0163747 | A1 * | 7/2007 | Baro | B60H 1/00378 165/41 |
| 2007/0184775 | A1 * | 8/2007 | Perkins | B60H 1/262 454/273 |
| 2007/0298702 | A1 * | 12/2007 | Boxum | B60H 1/00364 454/129 |
| 2008/0045135 | A1 * | 2/2008 | Pfannenberg | F04D 29/646 454/184 |
| 2008/0060798 | A1 * | 3/2008 | Keen | B60H 1/00378 165/202 |
| 2008/0139101 | A1 * | 6/2008 | Bickel | B60H 1/262 454/136 |
| 2010/0009621 | A1 * | 1/2010 | Hsieh | F21V 33/0096 454/293 |
| 2010/0056035 | A1 * | 3/2010 | Hua | B60H 1/00364 454/139 |
| 2010/0218529 | A1 * | 9/2010 | Melbostad | B60H 1/00371 62/244 |
| 2010/0218530 | A1 * | 9/2010 | Melbostad | B60H 1/00371 62/244 |
| 2011/0061414 | A1 * | 3/2011 | McAllister, II | B60H 1/00371 62/244 |
| 2011/0097983 | A1 * | 4/2011 | Lugas | B60H 1/262 454/145 |
| 2011/0232862 | A1 * | 9/2011 | Gofton | A47J 31/005 165/64 |
| 2011/0294412 | A1 * | 12/2011 | Vagedes | F24F 7/02 454/242 |
| 2012/0087128 | A1 * | 4/2012 | Zakula | F21V 33/0088 362/249.02 |
| 2012/0309281 | A1 * | 12/2012 | Russ | B60H 1/00407 454/136 |
| 2013/0165038 | A1 * | 6/2013 | Railkar | E04D 13/176 454/365 |
| 2013/0175819 | A1 * | 7/2013 | Hindle | B60P 3/00 296/24.3 |
| 2014/0060795 | A1 * | 3/2014 | Yu | B60H 1/00821 165/202 |
| 2014/0235154 | A1 * | 8/2014 | Song | B60H 1/262 454/94 |
| 2014/0256243 | A1 * | 9/2014 | Wood | B60H 1/245 454/136 |
| 2014/0256244 | A1 * | 9/2014 | Sakurai | B60H 1/245 454/140 |
| 2014/0260393 | A1 * | 9/2014 | Siddiqui | B60H 1/00364 62/244 |
| 2015/0140916 | A1 * | 5/2015 | Bickel | B60H 1/262 454/136 |
| 2015/0352924 | A1 * | 12/2015 | Allard | B60H 1/00364 454/94 |
| 2016/0047387 | A1 * | 2/2016 | Butcher, Jr. | F04D 25/14 417/53 |
| 2016/0193899 | A1 * | 7/2016 | Kelly | B60H 1/262 454/145 |
| 2016/0200174 | A1 * | 7/2016 | Tremer | B60H 1/262 454/111 |

(56) References Cited

U.S. PATENT DOCUMENTS

| | | | |
|---|---|---|---|
| 2017/0036515 A1* | 2/2017 | Ko | B60H 1/3227 |
| 2017/0043647 A1* | 2/2017 | Vergamini | B60H 1/3202 |
| 2017/0210205 A1* | 7/2017 | Mosby | B60H 1/245 |
| 2017/0274734 A1* | 9/2017 | Csordas | G01N 33/5308 |
| 2018/0065450 A1* | 3/2018 | Hurst | B60H 1/3208 |
| 2018/0105020 A1* | 4/2018 | Smith | B60J 7/1642 |
| 2018/0147913 A1* | 5/2018 | Bergin | B60H 1/00364 |
| 2018/0178622 A1* | 6/2018 | Hipp-Kalthoff | B60H 1/00371 |
| 2018/0236856 A1* | 8/2018 | Eastwood | B60H 1/3421 |
| 2018/0264912 A1* | 9/2018 | Hipp-Kalthoff | B60H 1/00521 |
| 2018/0326819 A1* | 11/2018 | Abts | B60H 1/00364 |
| 2018/0370339 A1* | 12/2018 | Bacon | B60J 1/2088 |
| 2019/0047353 A1* | 2/2019 | Williamson | B60H 1/00364 |
| 2019/0047354 A1* | 2/2019 | Williamson | B60H 1/00364 |
| 2019/0061829 A1* | 2/2019 | Fleckenstein | B62D 25/06 |

FOREIGN PATENT DOCUMENTS

| | | |
|---|---|---|
| DE | 636749 C | 10/1936 |
| DE | 1559779 A1 | 3/1970 |
| DE | 3224896 A1 | 1/1984 |
| DE | 9313437 U1 | 12/1993 |
| DE | 10025950 C1 | 8/2001 |
| DE | 10064282 A1 | 7/2002 |
| DE | 20316827 U1 | 12/2003 |
| DE | 102007030851 A1 | 2/2009 |
| DE | 102008016305 A1 | 10/2009 |
| DE | 102009050875 A1 | 4/2011 |
| DE | 102012105375 A1 | 12/2013 |
| DE | 202017106376 U1 | 12/2017 |
| DE | 102017206449 A1 | 10/2018 |
| DE | 102018205680 A1 | 10/2018 |
| DE | 102017209810 A1 | 12/2018 |
| EM | 003349224-0001 | 8/2016 |
| EM | 003349224-0002 | 8/2016 |
| EM | 003353051-0001 | 8/2016 |
| EM | 003353051-0002 | 8/2016 |
| EM | 003353051-0003 | 8/2016 |
| EM | 003353051-0004 | 8/2016 |
| EM | 003353051-0005 | 8/2016 |
| EM | 003353051-0006 | 8/2016 |
| EM | 003353051-0007 | 8/2016 |
| EM | 003353051-0008 | 8/2016 |
| EM | 003353051-0009 | 8/2016 |
| EM | 003353051-0010 | 8/2016 |

OTHER PUBLICATIONS

German Patent Application No. 102017214863.2 entitled "Caravan Window with Ventilation" filed Aug. 17, 2018.
German Patent and Trademark Office, Office Action in Application No. 102017214863.2 dated Dec. 18, 2017.
DE Examination Report Mailed in Patent Application No. 102017206449.8 dated Jan. 24, 2018.
Australian Patent Application No. 2018202588 entitled "Slider opening mechanism" filed on Apr. 13, 2018.
DE Examination Report Mailed in Patent Application No. 102018205680.3 dated Nov. 18, 2019.
DE Examination Report Mailed in Patent Application No. 102017206449.8 dated Nov. 18, 2019.

* cited by examiner

CARAVAN WINDOW WITH VENTILATION

This utility patent application claims priority to and benefit of, under 35 U.S.C. § 119(e), German application number 10 2017 214 863.2, filed Aug. 24, 2017, titled, "Caravan Window with Ventilation", all of which is incorporated by reference herein.

The present embodiments relate to an improved rooflight or window for vehicles, particularly for a recreational vehicle, caravan or mobile home and the like.

Typically, rooflights for caravans are equipped with a ventilation system and, thus, ventilation slots for letting the air pass through are present on the surface of the rooflight frame or window frame facing the inside of the caravan. Besides the purpose of letting air pass through, sometimes also sunlight can pass through these slots and enter the inside of the caravan, which is not desired.

The object of the present embodiments is, therefore, to provide a rooflight with ventilation in which no direct sunlight can enter the inside of a vehicle through the ventilation of the rooflight while the efficiency of the ventilation does not suffer.

To solve the above posed problem, the present embodiments provide a rooflight or window for vehicles, such as for a recreational vehicle, comprising a window frame, the window frame comprises a ventilation path allowing air exchange between the inside and the outside of the vehicle, wherein the window frame comprises ventilation slots at least at a surface of the window frame facing the inside of the vehicle, wherein the rooflight or window further comprises a cover being connected to the window frame and at least partly covering the surface of the window frame facing the inside of the vehicle, wherein along the outer edge of the window frame a circumferential gap is present between the cover on the one side of the gap and the window frame and the roof or sidewall, respectively, on the one side of the gap, wherein the gap functions as a canal for ventilation air.

The cover of the present embodiments hide the ventilation slots and, thus, also provides for a better optical appearance compared to rooflights with visible ventilation slots on the frame. Between the cover and the window frame, an air canal is formed which guides the ventilation air to the outer edge of the rooflight or window. At said outer edge, the air passes through the gap of some embodiments.

In the context of the present embodiments, the terms rooflight and window are used interchangeably, unless this is logically and technically excluded in the context of an embodiment described herein.

With the present embodiments it can be ensured that the air canal formed between window frame and cover has an overall cross-sectional area which is larger than the area of all ventilation slots together present on the window frame. Thereby, a reduction of ventilation efficacy can be prevented.

According to some embodiments, the cover is removably connected to the window frame. This has the advantage that, for maintenance purposes, for example, the cover can be easily removed from the window frame. In case of a rooflight, the cover, preferably, is simply pressed upwardly from below the frame of the rooflight against the frame in order to fix the cover to the frame According to some embodiments, the surface of the window frame facing the inside of the vehicle is plane-parallel to a plane defined by the window frame.

According to some embodiments, the ventilation slots are at least present on a surface of the window frame which is perpendicular to a plane defined by the surface of the window frame. This shortens the entire ventilation path, since the respective slot are near the gap of the present invention.

According to some embodiments, the window frame comprises fixation structures on the surface of the window frame which is plane-parallel to a plane defined by the window frame for connecting the cover to the window frame. Such fixation structures can comprise, for example pin holes which interact with respective pins provided at the cover.

According to some embodiments, along an inner edge of the window frame no circumferential gap is present corresponding to the gap along the outer edge of the window frame.

Figure 2:
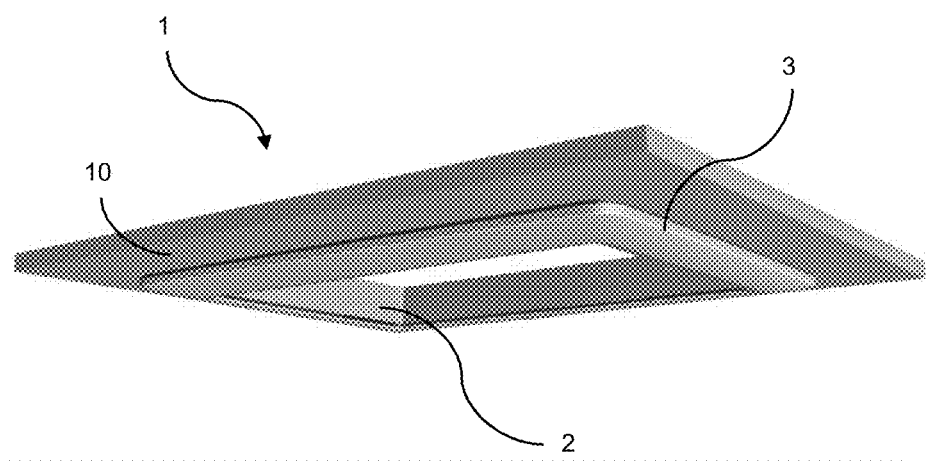
Figure 3:
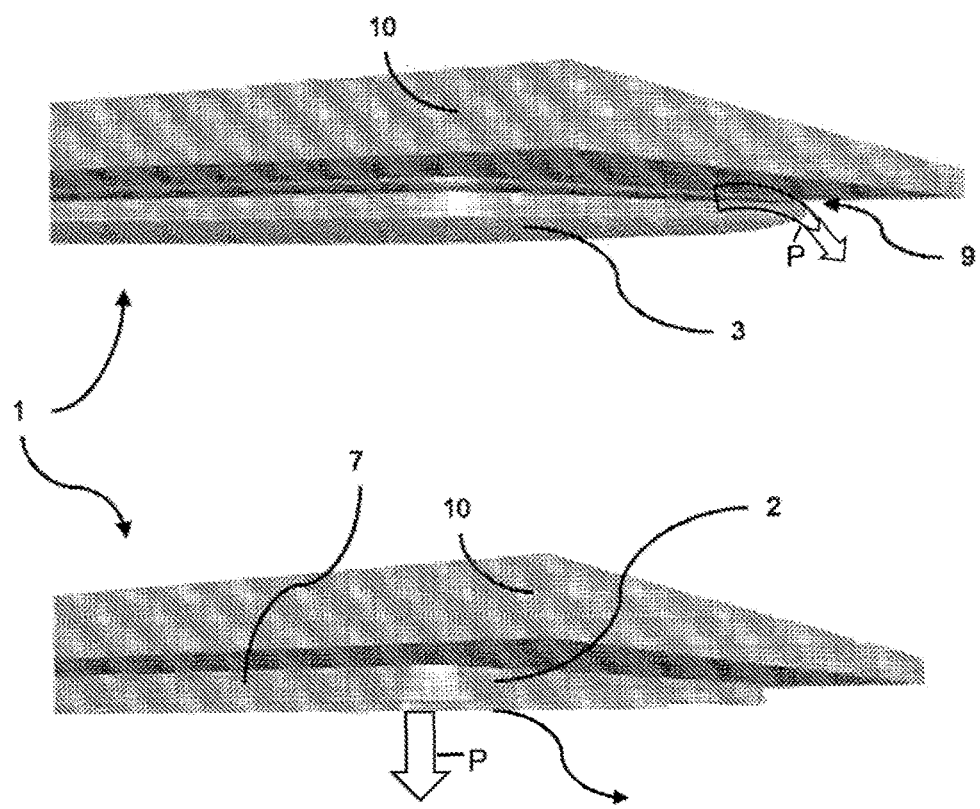
Figure 4:
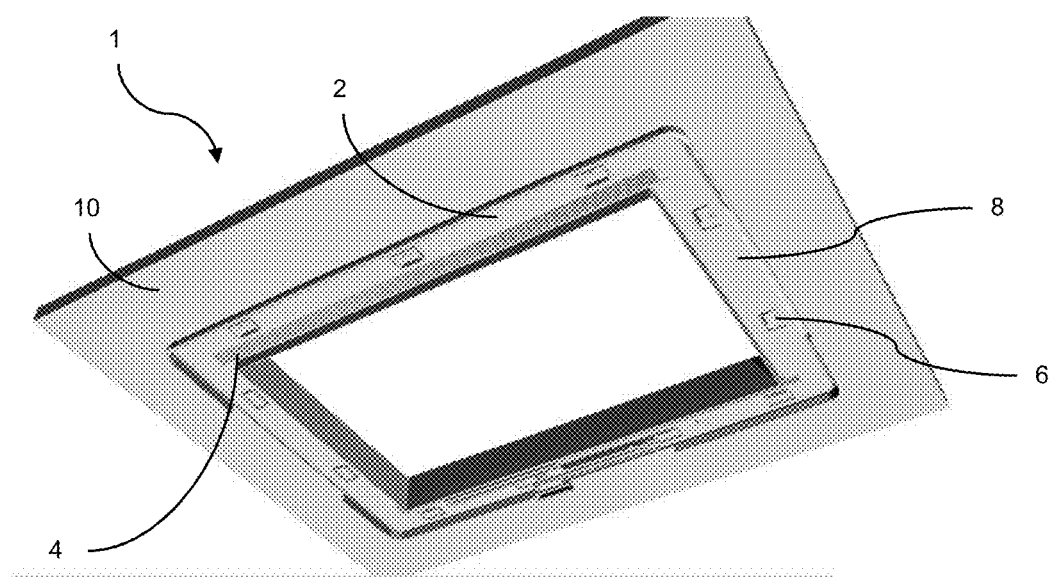
Figure 5:
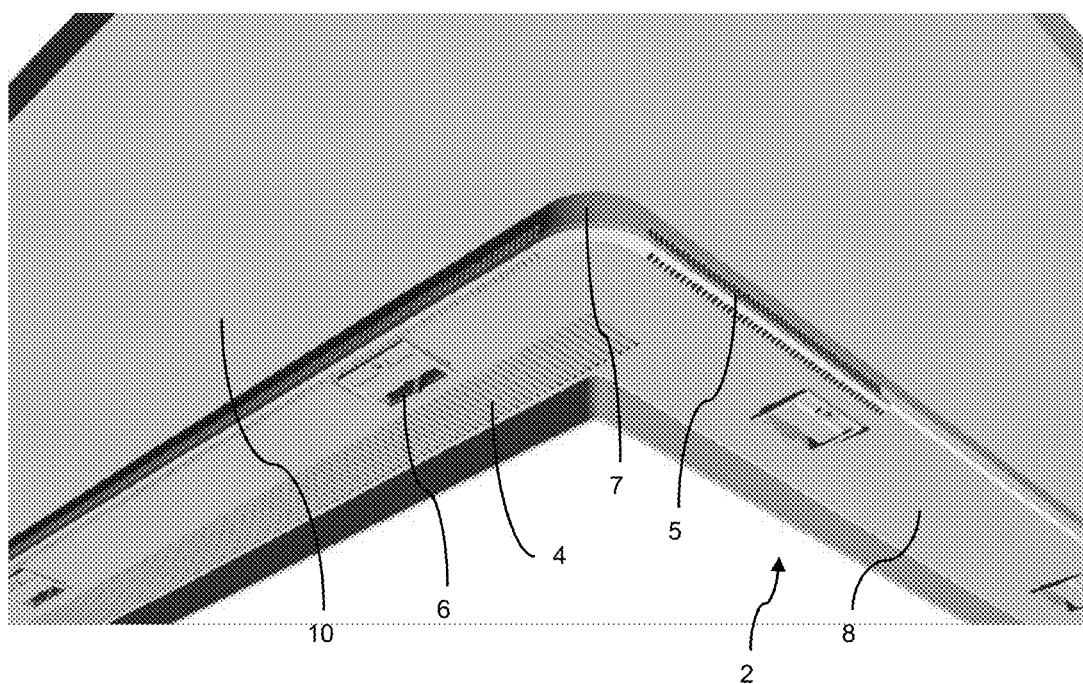

In the following, at least one embodiment will be described in detail with reference to the figures, in which FIG. 1 shows a perspective view on the rooflight of the embodiment, FIG. 2 shows another perspective view on the rooflight of the embodiment, FIG. 3 shows two side view on the rooflight of the embodiment, one with cover, one without cover, FIG. 4 shows a perspective view on the rooflight of the embodiment without cover and FIG. 5 shows a magnified part of the rooflight of the embodiment without cover.

FIGS. 1 and 2 illustrate a rooflight 1 of one embodiment which is mounted into a roof 10 of a vehicle. A window frame 2 of the rooflight 1 is covered with a cover 3 so as to hide any ventilation slots 4, 5 present on the window frame 2.

As shown in FIG. 3, air can pass through a gap 9 between the cover 3 and the roof 10. The gap 9 is large enough so as to not hinder the air from passing through the gap 9. This prevents noise and ensures effective ventilation. The cover 3 is designed as such it can be grabbed with both hands on opposite sides and pulled downwards so as to dismount the cover 3 from the frame 2.

Further in FIG. 3, it can be identified that a part of a surface 7 of the window frame 2 which is perpendicular to a plane defined by the window frame 2 represents one side of the gap 9.

In FIGS. 4 and 5 the rooflight 1 of the embodiment is shown from below with the cover 3 taken off. A fixation structures 6 can be identified in these figures. As shown, these particular fixation structures consist of specific holes or pin holes into which the corresponding parts (not shown) present on the cover 3 can be introduced. These fixation means 6 are designed so as to block the least possible space within the ventilation path P (FIG. 3) formed between the window frame 2 and the cover 3. The aim thereof is to hinder as little as possible the airflow between the ventilation slots 4 and the gap 9.

The magnified section of the rooflight shown in FIG. 5 reveals the ventilation slots 5 being present at least on the surface 7 of the window frame 2 which is perpendicular to the plane defined by the window frame 2. As mentioned above, this measure shortens the entire ventilation path P (FIG. 3) of the rooflight 1 and, therefore, the efficacy is practically not reduced at all by the cover 3.

The ventilation air passes the gap 9 and does not pass through a gap between the inner edge of the window frame 2 and the cover 3. This prevents fogging-up the rooflight, for example, in case it is hot and humid outside and the air condition is running in the inside, resulting in a relatively colder glass of the rooflight.

LIST OF REFERENCE SIGNS

1 Rooflight
2 Window frame
3 Cover
4 Ventilation slots
5 Ventilation slots
6 Fixation structures
7 Surface on window frame
8 Surface on window frame
9 Gap
10 Roof

The invention claimed is:

1. A rooflight or window for a recreational vehicle, comprising:
   a window frame, wherein the window frame comprises a ventilation path allowing air exchange between an inside and an outside of the recreational vehicle, wherein the window frame comprises ventilation slots at least at a surface of the window frame facing the inside of the recreational vehicle,
   a cover being connected to the window frame and at least partly covering the surface of the window frame, the cover located inside of the recreational vehicle and covering the ventilation slots;
   wherein along an outer edge of the window frame a gap is present between the cover and a roof, wherein the gap further defines the ventilation path for ventilation air, and wherein direct sunlight is precluded from entering the recreational vehicle through the ventilation slots of the window frame.

2. The rooflight or window for a recreational vehicle of claim 1, wherein the cover is removably connected to the window frame.

3. The rooflight or window for a recreational vehicle of claim 1, wherein the surface of the window frame facing the inside of the recreational vehicle is parallel to a plane defined by the window frame.

4. The rooflight or window for a recreational vehicle of claim 1, wherein the ventilation slots are at least present on a surface of the window frame which is perpendicular to a plane defined by the surface of the window frame.

5. The rooflight or window for a recreational vehicle of claim 1, wherein the window frame comprises fixation structures on the surface of the window frame which has a plane parallel to a plane defined by the window frame for connecting the cover to the window frame.

6. The rooflight or window for a recreational vehicle of claim 1, wherein along an inner edge of the window frame no circumferential gap is present corresponding to the gap along an outer edge of the window frame.

* * * * *